United States Patent [19]

Werth

[11] Patent Number: 5,473,707
[45] Date of Patent: Dec. 5, 1995

[54] PATTERN PROCESSING SYSTEM WITH WEIGHTED TRAINING CODES

[75] Inventor: Larry J. Werth, Eagan, Minn.

[73] Assignee: Electro-Sensors, Inc., Eden Prairie, Minn.

[21] Appl. No.: 107,100

[22] Filed: Aug. 16, 1993

[51] Int. Cl.⁶ .................................................. G06K 9/62
[52] U.S. Cl. ........................................ 382/160; 382/228
[58] Field of Search .................................. 382/14, 15, 37, 382/36, 41, 49, 30, 155, 159, 160, 161, 225, 226, 228, 209, 305

[56] References Cited

U.S. PATENT DOCUMENTS

| | | | |
|---|---|---|---|
| 4,504,970 | 3/1985 | Werth et al. | 382/14 |
| 4,541,115 | 9/1985 | Werth | 382/14 |
| 4,550,431 | 10/1985 | Werth et al. | 382/37 |
| 4,551,850 | 11/1985 | Werth et al. | 382/14 |

*Primary Examiner*—Joseph Mancuso
*Attorney, Agent, or Firm*—Schwegman, Lundberg & Woessner

[57] ABSTRACT

A pattern processing system associates image input patterns with desired response codes. The image input is stored in an image buffer as an addressable array of sample values. An address sequencer provides a sequence of addresses (or "address stream") to the image buffer and to a response memory. The next address provided by the address sequencer is based upon the current address and the state of the sample value stored in the image buffer at the location corresponding to the current address. Once the address sequencer repeats and address, the address stream is in a repetitive address loop as long as the image stored in the image buffer remains constant. The address loop continues to be generated since the address sequencer always produces the same next address based upon the same current address and the same sample value stored at that current address. During a training mode, a pattern to be recognized is supplied to the image buffer and a training code representing a desired response is written into the response memory at selected locations that correspond to addresses in the address loop being generated. During a later recognition mode, when the same pattern is supplied to the image buffer, the same address loop is again generated. The previously stored training codes are read from the response memory. A response detector provides a response code output representative of the pattern based upon the most frequent code read out from the response memory.

24 Claims, 6 Drawing Sheets

IMAGE BUFFER 12

PATTERN A    PATTERN B

ADDRESS SEQUENCER 14

NEXT ADDRESS IF SAMPLE VALUE=0    NEXT ADDRESS IF SAMPLE VALUE=1

RESPONSE MEMORY 16

PRIOR ART
FIG. 2

PATTERN PROCESSING SYSTEM WITH WEIGHTED TRAINING CODES

RELATED CASES

This application is related to U.S. patent application Ser. No. 08/107,401, entitled, "Pattern Processing System with Minimum Length Address Loops," filed Aug. 16, 1993, to Werth; and to U.S. patent application entitled, "Pattern Processing System using Edge Projection," to be filed to Werth.

FIELD OF THE INVENTION

This invention relates to systems for identifying patterns, and more particularly, to an improvement in training a pattern processing system to recognize a class of input patterns.

DESCRIPTION OF THE PRIOR ART

U.S. Pat. No. 4,541,115 to Werth entitled "Pattern Processing System," issued Sep. 10, 1985 and hereby incorporated herein in its entirety, discloses a pattern processing system wherein an image input pattern is identified based upon an address loop which is generated when individual values of the input pattern are addressed sequentially (the "Werth system"). As shown in FIG. 1, the system 10 includes an image buffer 12 for storing the image input pattern, an address sequencer 14 for sequentially addressing the image buffer 12, and an identifying circuit or module comprising training controller 18, response memory 16 and response detector 20. The identifying module is responsive to the address stream generated by the address sequencer to identify the image input pattern based upon the address loop which is generated.

The image buffer 12 stores sample values representative of the image input pattern in a first array of addressable locations. This first array is addressed by the address stream produced by the addresser sequencer 14. The address sequencer 14 determines the next address in the sequence based upon at least one preceding address and the sample value(s) which are stored by the image buffer 12 at the location which corresponds to the preceding address(es). As a result, when an address which has previously been provided in the sequence is repeated, the address stream cycles repetitively through an address loop. Because the next address is always determined by the preceding address and the sample value, the address loop generated is a function of the image input pattern. This address loop is used to identify the image input pattern.

In other words, the basis of the Werth system is that a repetitive address loop is generated by the address sequencer, and that this address loop characterizes the image input pattern which is present. Because the address sequencer determines the next address of the sequence based upon a preceding address and the sample value stored by the addressable input buffer at the location corresponding to that preceding address, a repetitive address loop will be produced as long as the input pattern does not change. The particular addresses contained in the address loop are a function of the input pattern, and are used to identify that pattern each time it occurs.

In preferred embodiments, the response memory 16 contains an array of addressable locations which are addressed by the address stream produced by the address sequencer 14. During a training mode, a pattern to be identified is presented, and the training controller 18 causes a training code to be written into selected locations in the second array which are addressed by the sequence of addresses. The training code represents a desired output response to be produced when that pattern is present.

When the image input pattern is later provided as input to the pattern processing system, the address sequencer 14 again addresses the first array and the second array. The response detector 20 provides an output response based upon the training codes which are read out from locations addressed by the address stream.

Address sequencer 14 of the Werth system can take several different forms. In one embodiment, address sequencer 14 is a pseudo-random number generator which computes the next address based upon the current address and the sample value. In another embodiment, address sequencer 14 is a read only memory (ROM) with associated logic. The ROM contains a next address for each possible input combination (current address and sampled value). In either embodiment, the sampling rules governing operation of address sequencer 14 are consistent. That is, resampling of an address always results in the same next address if the sample value is unchanged. Where the sample value is either a "1" or a "0", address sequencer 14 provides one address if the sample value is a "1" and a different address if the sample value is "0". Each time address sequencer 14 produces a particular address and it receives a sample value of "1", it will always sequence to one predetermined next address. Similarly, whenever the address sequencer 14 is at the particular address and receives a sample value of "0", it will always sequence to another (different) predetermined next address.

The output of address sequencer 14, therefore, is a continuous stream of addresses, and its input is a continuous stream of sample values from image buffer 12. The basis of operation of the system 10 of the present invention is that an "address loop" will be generated which characterizes the image input pattern which is present. Because the sampling rules which govern the address produced by address sequencer 14 are consistent, once address sequencer 14 repeats an address, it will repeat the same sequence of addresses and will remain in this address loop as long as the image input to image buffer 12 is unchanged.

To illustrate the operation of the pattern processing system 10 FIG. 1, an extremely simple example illustrated in FIG. 2 will be used. In this simple example, it is assumed that image buffer 12 stores the image input in the form of a nine-bit binary pattern, and that the pattern processing system is expected to distinguish between "Pattern A" and "Pattern B" shown in FIG. 2. Pattern A contains "1" at address Nos. 3, 5 and 7; and "0" at address Nos. 1, 2, 4, 6, 8 and 9. Pattern B contains "1" at address Nos. 1, 3, 4, 6, 7 and 9; and "0" at address Nos. 2, 5 and 8.

FIG. 2 also includes an illustration of the next addresses generated by address sequencer 14, depending upon whether the sample value from image buffer 12 is "0" or "1". For example, if address No. 2 contains a "0", the next address generated by address sequencer 14 is address No. 5. If the sample value at address No. 2 is a "1", the next address generated by address sequencer 14 is address No. 8.

In the single example, it is also assumed that address sequencer 14 begins with address No. 1. When Pattern A is present in image buffer 12, address sequencer 14 generates the following address stream: "1, 8, 3, 6, 9,8, 3, 6, 9, 8 . . . " The address loop which is generated is "8, 3, 6, 9". For this example, the same address loop is generated regardless of where address sequencer 14 starts. After several addresses have been produced, eventually address sequencer 14 reaches address No. 8. It then locks in on the sequence "8, 3, 6, 9 . . ." and will remain in that address loop as long as Pattern A is present.

In the case of Pattern B, address sequencer 14 generates the following address stream: "1, 9, 2, 5, 1, 9, 2, 5, 1 . . ." The address loop generated is "1, 9, 2, 5".

During training, a training code input of either "A" or "B" is written into response memory 16 by training controller 18. In this example, it is assumed that Pattern A was presented first during training. It is further assumed that training controller 18 causes the training code input to be stored at all locations of response memory 16 which are addressed. In this example, therefore, training code "A" is written into locations 1, 8, 3, 6 and 9 because the sequence of addresses began with address No. 1, and because the remaining addresses all constitute part of the address loop.

In actual applications, assignment of training codes to transition addresses (addresses before entering a loop address) can easily be avoided or minimized. First, the input pattern is generally presented before training is initiated through controller 104 and therefore, due to the speed of the address sequencer 14, a loop would already have been generated. Second, in an application where the input pattern may be changing during training, a periodic (in time) assignment of the training code can be selected and, since loop addresses occur repeatedly and transition addresses do not, most of the training code assignments will be to addresses in loops.

When Pattern B was presented subsequently during training, the training code input "B" was written into response memory 16 by training controller 18 at locations 1, 9, 2 and 5. In this case, training controller 18 caused the training code "B" to be written over the previously stored training code "A" at address No. 1 and address No. 9.

The contents of response memory 16, after training has been completed, is illustrated in FIG. 2. Training code "A" is stored at address Nos. 3, 6 and 8, while training code "B" is stored at address Nos. 1, 2, 5 and 9.

In this example, the image input is presented during normal operation in the form of either Pattern A or Pattern B. The sequential addressing of image buffer 12 and response memory 16 is again performed by address sequencer 14. If Pattern A is present, address sequencer 14 again generates the address loop "8, 3, 6, 9, 8, 3, 6, 9, 8 . . ." This causes the response memory 16 to be read out as "A, A, A, B, A, A, A, B, A . . ."

If Pattern B is present, address sequencer 14 again generates the address loop "1, 9, 2, 5, 1, 9, 2, 5, 1" The output of response memory 16 is then "B, B, B, B, B, B, B, B, B . . .".

Response detector 20 monitors the output of response memory 16, and determines which of the two codes read out from response memory 16 was produced most frequently. When Pattern A was presented to image buffer 12, the output of response memory 16 was most frequently "A". When the image input to image buffer 12 was Pattern B, the output of response memory 16 is most frequently "B". Response detector 120 provides the response code output of either "A" or "B" depending upon the frequency of occurrence of the particular code read out from response memory 16.

From this simple example, it can be seen that the present invention provides an association between a training code input and an image input which causes pattern processing system 10 to generate the same response code whenever the same input image is presented to the image buffer 12. Of course, in practical applications, the number of sample values of the image input is much greater than the nine values which are used in the example of FIG. 2, and both image buffer 12 and response memory 16 are capable of storing much larger arrays of data. Also, more than one address loop may be possible for a particular image input (e.g. 7.5 loops are expected for an image of 1,000,000 samples) in which case response memory addresses in each loop would be assigned the training code. The operation described in this example, however, applies to larger input images as well.

It can be seen that the association of a desired response (in the form of a training code input) with a particular image input is not dependent upon any complicated or specialized computer software. In fact, the association between the training code input and the image input is provided by hardware, and is independent of the particular source of the image input (visual, audio or tactile). This makes the pattern processing system of the present invention applicable to a wide variety of different pattern recognition tasks.

One limitation in the Werth system occurs when input patterns are subject to random noise or too many variations. In this case the address loops which occur during training or recognition will be highly variable. That is, a small change in the input pattern may cause a large change in the address loop. As a result, during training, the response memory 16 can become filled with the training code associated with one class of input patterns (e.g. samples of the digit "2" belong to one class of input patterns). Recognition deteriorates as the response memory 16 becomes filled with each training code, as more and more preexisting training Codes are written over. Noisy patterns with many variations are typical for many recognition tasks such as speech recognition or visual pattern recognition. In the case of visual recognition of hand printed numbers, there are many variations of each of the 10 digits. For example, training all variations of the digit "2" may nearly fill the response memory 16 with the training code for "2". If the response memory 16 is nearly filled with the training code for each digit, recognition and differentiation between input patterns will be degraded.

This problem can be more fully understood by considering an address sequencer with 32,767 total addresses and an average cycle length of 388. Each address generated by the address sequencer 14 also addresses the input buffer 12 containing the sample values that comprise the input pattern. If any one of the 388 sample values accessed by the address loop is changed it will take an average of 59 sample points to return to the original loop if no other points are changed. As a result, a whole new loop will occur if more than approximately 6 of the 388 points are changed. Consider a single class of input pattern subjected to 100 instances of random noise during training (e.g. 100 different samples of the digit "2"). One hundred loops of approximately 388 addresses would be generated for a total of 38,800 addresses. Depending upon the amount of noise, the response memory of 32767 addresses could become filled. If each class of pattern tends to fill the entire response memory 16 with its training code, different classes will become less distinguishable and recognition will deteriorate.

Therefore, there is a need for an method and apparatus for addressing these limitations in the Werth System.

SUMMARY OF THE INVENTION

The present invention provides method and apparatus for pattern recognition, and in particular method and apparatus for training the response memory in the Werth system. The invention limits the number of training codes stored in a response memory during training and therefore allows noisy input patterns to be recognized. The system counts the number of times each address is accessed by an address loop for each training code and stores the training code in the response memory only at those addresses which have occurred most frequently. The invention accumulates the number of times each address occurs in a loop for all samples within a class of input patterns and stores the associated training code only at the locations for which the count is above a preset threshold.

BRIEF DESCRIPTION OF THE DRAWINGS

FIG. 2 illustrates a simplified example of the operation of the pattern processing system of FIG. 1, including illustrations of two different image input patterns A and B which can be contained in the image buffer, diagrams illustrating the next address produced by the address sequencer depending upon whether the current address location of the image buffer contains a "0" or a "1", and an illustration of the contents of the response memory as a result of operation of the pattern processing system of FIG. 1.

DETAILED DESCRIPTION OF THE PREFERRED EMBODIMENTS

In the following detailed description of an example embodiment of the invention, reference is made to the accompanying drawings which form a part hereof, and which is shown by way of illustration only, specific embodiments in which the invention may be practiced. It is to be understood that other embodiments may be utilized and structural changes may be made without departing from the scope of the present invention.

The present invention limits the number of training codes stored in response memory 16 during training and therefore allows noisy input patterns to be recognized. The system counts the number of times each address is accessed by an address loop for each training code and stores the training code in response memory only at those addresses which have occurred most frequently. For example, one hundred samples of the digit "2" may be trained, each of which generates an address loop. These addresses within loops overlap depending upon the degree of similarity between the samples. If all samples of "2" were identical, the same address loop would occur 100 times, and the count for these addresses would be 100. Given noisy sample patterns, the number of addresses generated would expand and the counts would decrease. The system accumulates the number of times each address occurs in a loop for all samples within a class of input patterns and stores the associated training code only at the locations for which the count is above a preset threshold.

Figure 1:
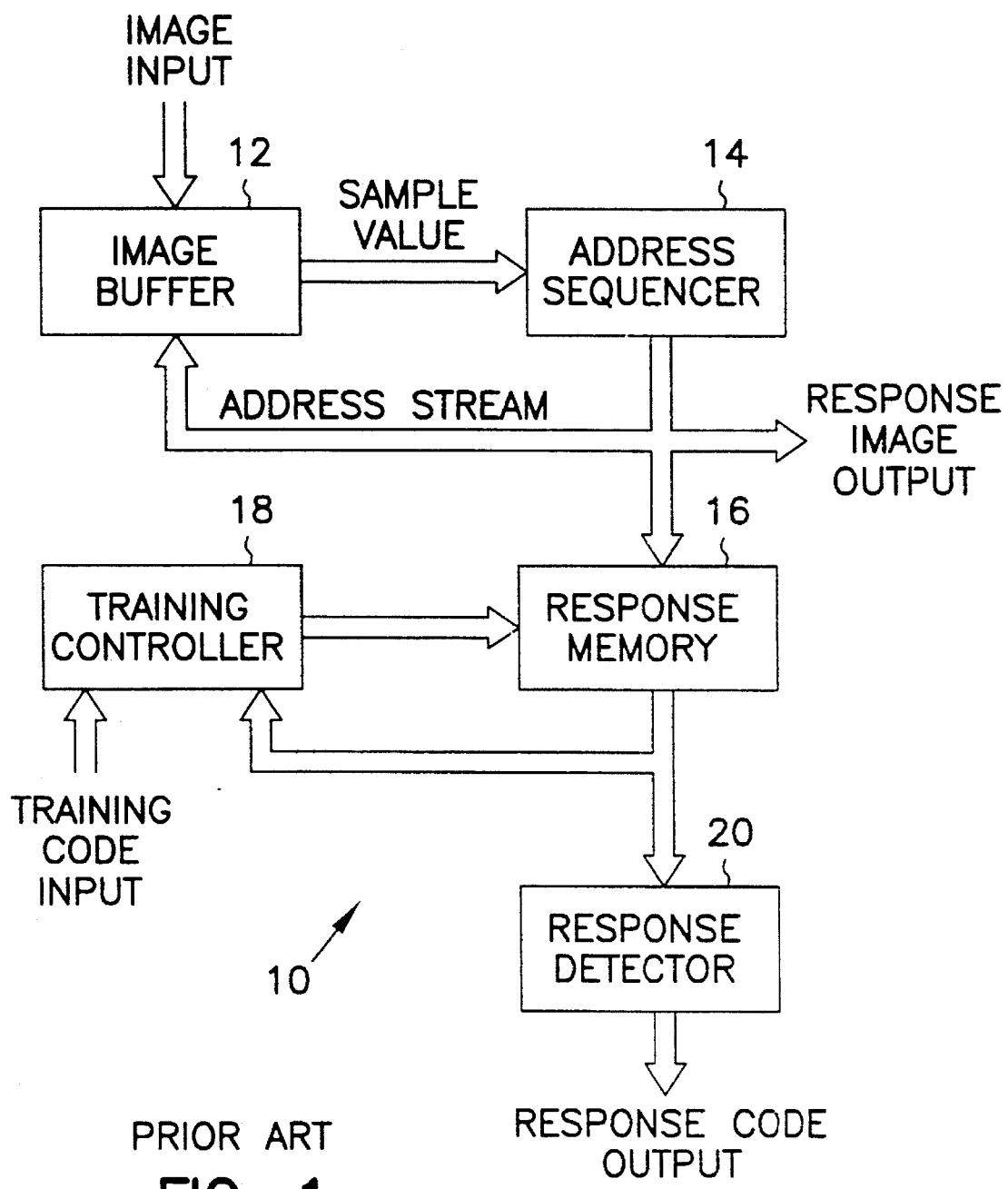
FIG. 1 is a block diagram of the prior art pattern processing system disclosed in U.S. Pat. No. 4,541,115.
Figure 3:
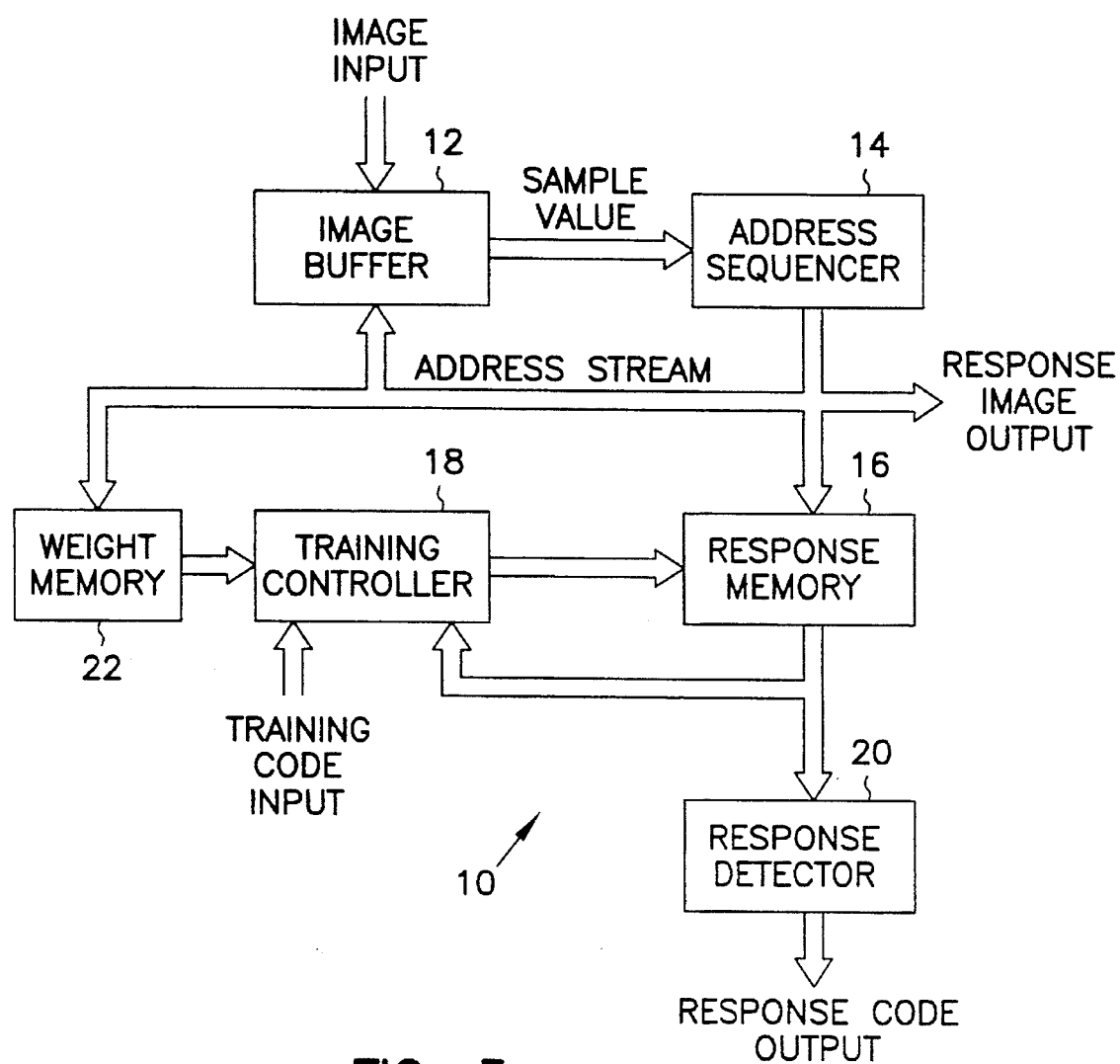
FIG. 3 is a block diagram of a pattern processing system including a weighing memory according to the present invention.

Referring now to FIG. 3, there is shown a schematic diagram of the training system according to the present invention. The system 20 includes the elements of system 10 (like elements having like numbers between the drawings), but in addition includes a weight memory 22. The weight memory 22 is another addressable memory the same size as the response memory 16. Every address generated by the address sequencer 14 addresses a unique memory location in the response memory 16 as well as the weight memory 22. When training a class of input patterns, a weight memory 22 location is incremented each time it is addressed within an address loop. After the entire class of input patterns have been trained, the associated training code is stored in response memory 16 by training controller 18 only at those addresses which have counts greater than a count threshold. The count threshold is set relative to the number of input patterns training in a class. If there are 100 input patterns in a class, then the possible range of the count threshold is from 1 to 100. For low count thresholds, the detailed features from each input pattern sample are trained. For large thresholds, the common features from the entire set of input patterns are trained.

Figure 4:
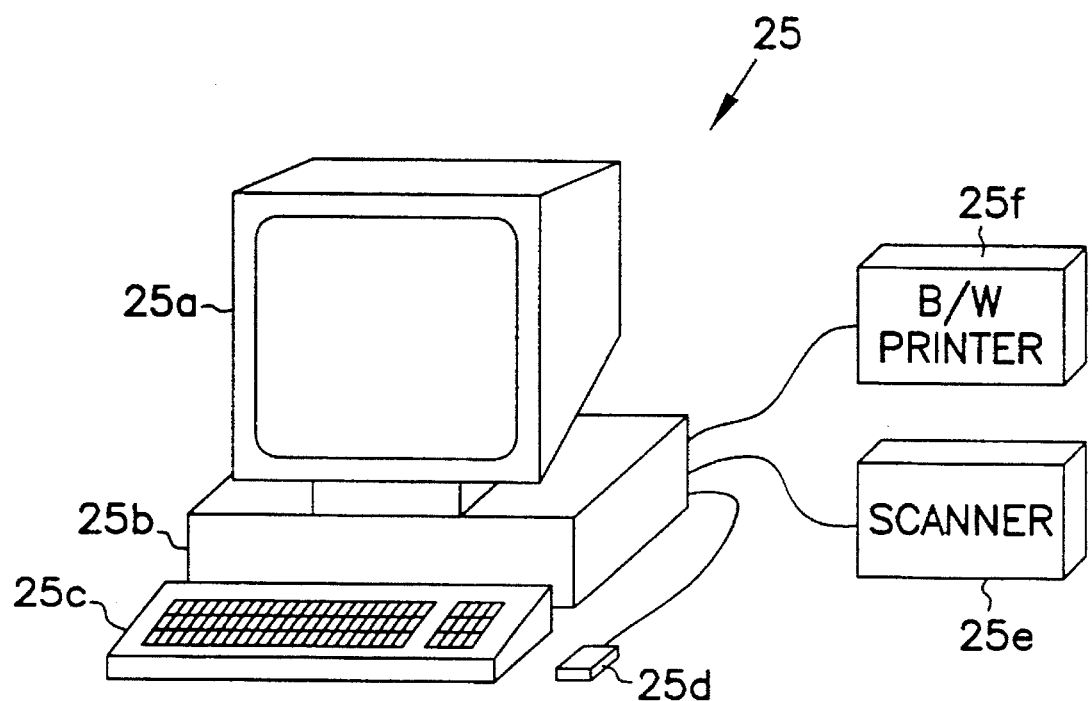
FIG. 4 is a block diagram of a hardware platform for use with the software implemented embodiments of the present invention.
Figure 5:
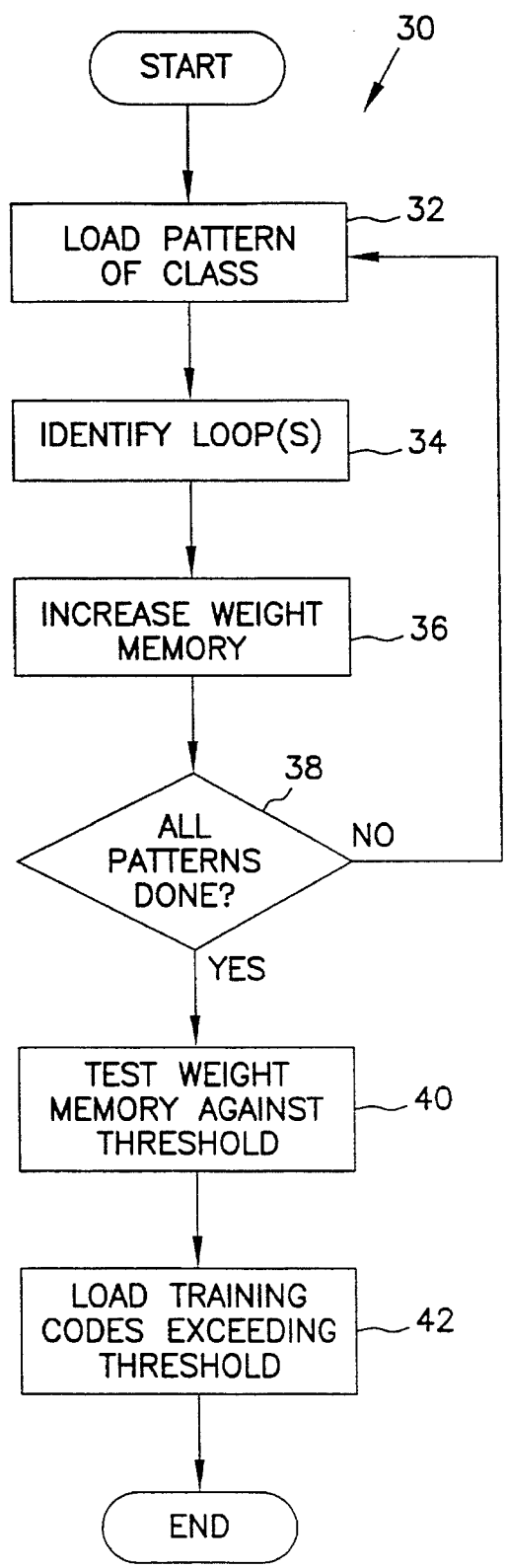
FIG. 5 is a flow chart of a software implementation of the weighted learning process for classes of input patterns according to the present invention.
Figure 6:
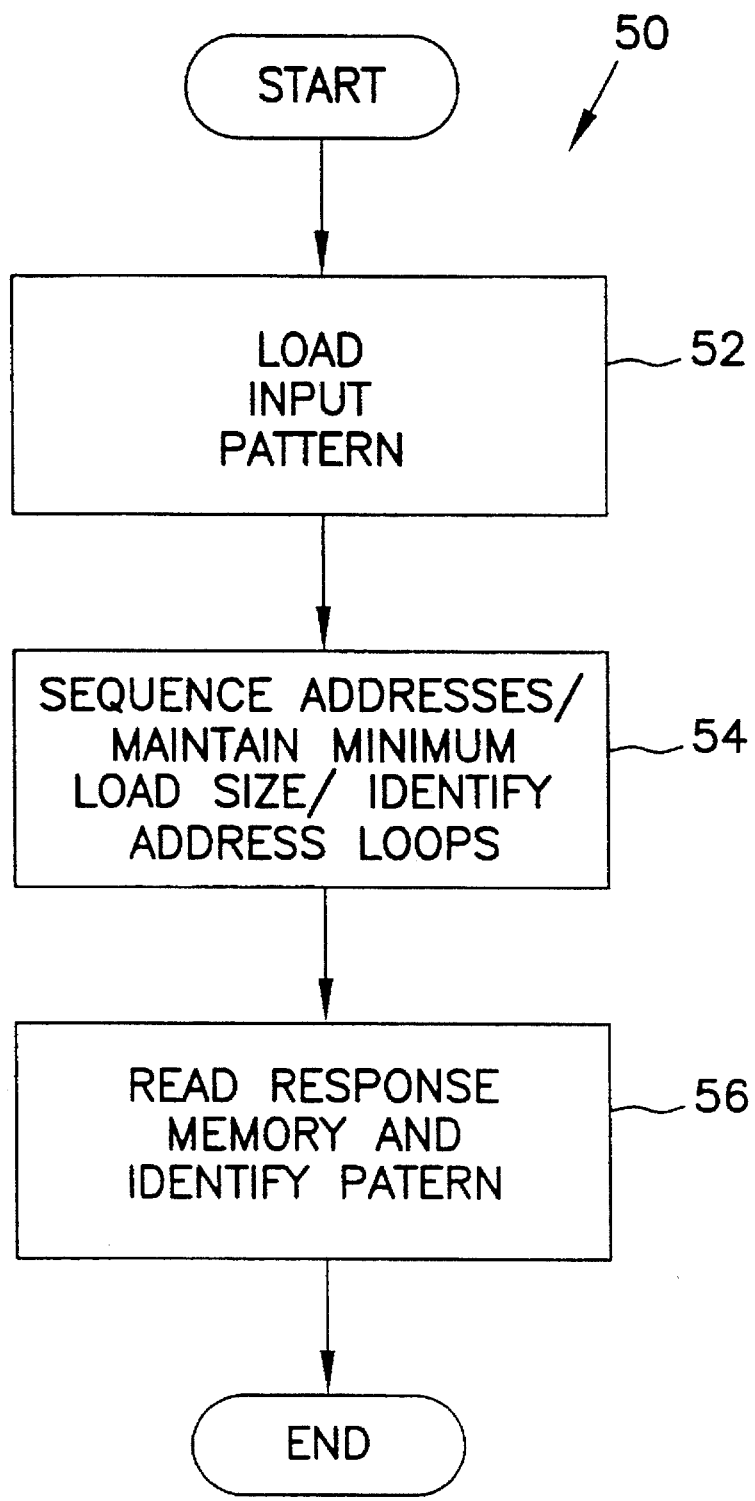
FIG. 6 is a flow chart of a software implementation of the recognition module of the pattern processing system according to the present invention.

Software implementations of the invention are shown in FIGS. 5 and 6. Such implementations are preferred, wherein the random access memory (RAM) of a workstation or PC is used to hold the image data and response data. A workstation or PC 25 suitable as a platform for the software implementations of the invention is illustrated in FIG. 4. Workstation or PC 25 is preferably of conventional construction, and includes a monitor 25a, a chassis 25b containing the processing unit, random access memory (RAM) and mass storage, and/or a frame grabber for input of video images, a keyboard 25c, a mouse 25d, a black/white printer 25f, and a scanner 25g for scanning input patterns to be processed.

FIG. 5 shows a software implementation 30 of the training module of the training controller 18 of the present invention. A pattern of a class is loaded into the image buffer 12 (32). The address loop(s) associated with the pattern are identified (34). The weight memory 22 is incremented at each address addressed in the loop (36). This repeats (38) until all patterns in a class have been processed. The elements in the array in the weight memory are then tested against the threshold (40), and training codes are loaded in the response memory (16) for those addresses which were addressed more than the threshold number of times (42).

Preferably, the present invention is implemented in combination with the system for maintaining minimum address loop lengths disclosed in U.S. patent application Ser. No. 08/107,401, entitled "Pattern Processing System with Minimum Length Address Loops, "filed Aug. 16, 1993, to Werth. Maintaining a minimum address loop length during training mode and recognition reduces the number of possible loops for any given input pattern and in turn improves recognition performance. The system of the present invention can also be used with the system for pattern processing based on edge projections disclosed in U.S. patent application to be filed entitled, "Pattern Processing System using Edge Projection," to Werth. Of course, the present invention is useful in any of the various modes disclosed in U.S. Pat. No. 4,541,115 to Werth. In yet another preferred alternate embodiment, the Werth system may be modified to provide that an input pattern be identified by multiple processing systems, each with different address loop generators to provide different address loops for the pattern in each system, with the processing systems "voting" as to the identification of the pattern. For example, if three systems identified the pattern as "A", and one as "B", "A" would be the identification.

FIG. 6 shows a software implementation 50 of a recognition module wherein the system for maintaining a minimum loop length is used. The input pattern to be recognized is loaded into the buffer or pattern memory (52), the address sequencer is run (maintaining minimum loop length) to identify the address loop(s) (54), and the corresponding training codes are read from response memory is read to identify the pattern (56).

Thus, there has been described an improved method and apparatus for training classes of patterns in the Werth system, whereby undesirable overloading of the response memory with a training code is avoided.

I claim:

1. A method of training for use in associating a class of input patterns with an output response, wherein each input pattern in the class comprises a plurality of sample values, the method comprising:

(a) producing the sample values based upon one input pattern of a class of input training patterns;

(b) storing the sample values of the input pattern in a first array of addressable locations;

(c) sequentially addressing the first array with a sequence of addresses in which each next address of the sequence is determined by a preceding address of the sequence and the sample value stored at the addressable location of the first array corresponding to the preceding address, so that a repetitive address loop which is a function of the input pattern is generated as long as the input pattern remains unchanged;

(d) repeating steps (a)-(c) for each input pattern of the class of input training patterns;

(e) determining the frequency with which the addresses of the first array reoccur in each repetitive address loop of the input patterns in the class of input training patterns; and (f) identifying reoccurring addresses, such that the reoccurring addresses can be used for associating the address loop of a selected input pattern of the class of input patterns with the output response.

2. The method of claim 1 wherein associating the output response with the address loop comprises:

sequentially addressing a second array of addressable locations with the sequence of reoccurring addresses;

storing a code representative of the output response at selected locations of the second array which are addressed by the sequence of reoccurring addresses;

reading codes from the locations of the second array addressed by the repetitive address loop of the selected input pattern; and providing the output response based upon the codes read from the second array.

3. The method of claim 2 wherein each next address of the sequence has a plurality of possible address values based upon the preceding address, and wherein the next address is selected from among the possible address values based upon a sample value related to the preceding address.

4. The method of claim 1 wherein each next address of the sequence has a plurality of possible address values based upon the preceding address, and wherein the next address is selected from among the possible address values based upon a sample value related to the preceding address.

5. A method according to claim 1 further wherein the step of determining the frequency with which the addresses of the first array reoccur is performed using a weighing array memory having address locations corresponding to the first array, and further wherein each time an address in the first array is addressed, a count number stored in the corresponding location in the weighing array is incremented.

6. A method of training for use in associating a class of input patterns with an output response, the method comprising:

(a) sequentially sampling elements of one of the patterns of an input training class to produce sample values representative of a characteristic of the elements sampled, the elements sampled being selected by a sequence of addresses in which each next address of the sequence is determined by a preceding address of the sequence and the sample value corresponding to the preceding address, so that a repetitive address loop which is a function of the pattern is generated as long as the pattern remains unchanged;

(b) repeating step (a) for each input pattern of the class of input training patterns;

(c) determining the frequency with which the addresses reoccur in each repetitive address loop of the input training patterns in the class; and (d) identifying reoccurring addresses, such that the reoccurring addresses can be used for associating the address loop of a selected input pattern of the class of input patterns with the output response.

7. The method of claim 6 wherein associating the output response with the address loop of the selected input pattern of the class of input patterns comprises:

sequentially addressing the response memory with the reoccurring addresses;

storing a code representative of the output response at selected locations of the response memory which are addressed by the reoccurring addresses;

reading codes from locations of the response memory which are addressed by the sequence of the selected input pattern; and providing the output response based upon the codes read from the response memory.

8. A method according to claim 6 wherein the step of determining the frequency with which the addresses of the first array reoccur is performed using a weighing array having address locations corresponding to the first array, and further wherein each time an address in the first array is addressed, a count number stored in the corresponding location in the weighing array is incremented.

9. A pattern processing system for identifying a class of input patterns comprising:

addressable means for providing, for each of a plurality of addressable locations, a sample value representative of a characteristic of the class at that addressable location;

address sequencer means for providing an address stream containing a sequence of addresses in which each next address of the sequence is determined by a preceding address and the sample value from the location corresponding to the preceding address; so that upon repetition of an address which has previously been provided in the sequence, the address stream cycles repetitively through an address loop which is a function of the input pattern for as long as the input pattern remains unchanged;

means responsive to the address stream for identifying the input pattern based upon the address loop which it causes to be provided by the address sequencer means, the means responsive to the address stream comprising response memory means for storing codes in a second array of locations addressable by the address stream, training controller means for selectively causing a predetermined training code to be associated with a class of input training patterns to be written into the response memory means at locations of the second array addressed by the address stream when a selected input pattern is addressed by the address sequencer means, the training controller means including means for determining the frequency with which the addresses in the sequences for the respective training patterns reoccur, so that reoccurring addresses between the respective training patterns can be identified, and means for writing the training code for the class of patterns in the reoccurring addresses for the class; and response detector means for providing an output response based upon codes read out from locations of the second array addressed by the address stream.

10. The pattern processing system of claim 9 wherein the response detector means provides the output response based upon frequency of the codes read out from the response memory means.

11. The pattern processing system of claim 9 wherein each next address of the sequence provided by the address sequencer means has a plurality of possible values based upon the preceding address, and wherein the sample value from the location corresponding to the preceding address determines which of the plurality of possible values is provided by the address sequencer means as the next address.

12. A system according to claim 9 wherein the training controller means includes a weighing array memory having address locations corresponding to the addressable means, and further including means responsive to an address being addressed in the addressable means for incrementing a count number at the corresponding address in the weighing array memory, whereby the frequency of addressing the various addresses of the addressable means is determined.

13. A method of training for use in associating a class of input patterns with an output response, the method comprising:

(a) storing data associated with one input training pattern of a class of training patterns in a first array of addressable locations;

(b) sequentially addressing the first array with a sequence of addresses in which each next address of the sequence is determined by a preceding address of the sequence and the data stored at the addressable location of the first array corresponding to the preceding address, so that a repetitive address loop which is a function of the input training pattern is generated as long as the input training pattern remains unchanged;

(c) repeating steps (a)–(b) for each input training pattern of the class of input training patterns and determining the frequency with which the addresses of the first array reoccur in each repetitive address loop of the input patterns in the class of input training patterns, so that reoccurring addresses can be identified; and (d) identifying reoccurring addresses, such that the reoccurring addresses can be used for associating the address loop of a selected input pattern of the class of input patterns with the output response.

14. The method of claim 13 wherein associating the output response with the address loop comprises:

sequentially addressing a second array of addressable locations with the sequence of reoccurring addresses;

storing a code representative of the output response at selected locations of the second array which are addressed by the sequence of reoccurring addresses;

reading codes from the locations of the second array addressed by the repetitive address loop of the selected input pattern sequence of addresses; and providing the output response based upon the codes read from the second array;

15. The method of claim 14 wherein each next address of the sequence has a plurality of possible address values based upon the preceding address, and wherein the next address is selected from among the possible address values based upon the data related to the preceding address.

16. The method of claim 13 wherein each next address of the sequence has a plurality of possible address values based upon the preceding address, and wherein the next address is selected from among the possible address values based upon the data related to the preceding address.

17. A method according to claim 13 wherein the step of determining frequency with which the addresses of the first array reoccur is performed using a weighing array memory having address locations corresponding to the first array, and further wherein each time an address in the first array is addressed, a count number stored in the corresponding location in the weighing array is incremented.

18. A method of associating a selected pattern belonging to a class of patterns with an output response, the method comprising:

(a) sequentially sampling data associated with one pattern of a class of training patterns to produce a value representative of a characteristic of the data sampled, the data sampled being selected by a sequence of addresses in which each next address of the sequence is determined by a preceding address of the sequence and the value corresponding to the preceding address, so that a repetitive address loop which is a function of the pattern is generated as long as the pattern remains unchanged;

(b) repeating step (a) for each pattern of the class of training patterns and determining the frequency with which the addresses in the sequences for the respective training patterns reoccur, so that reoccurring addresses can be identified; and (c) associating the output response with the selected pattern using the reoccurring addresses.

19. The method of claim 18 wherein associating the output response with the address loop comprises:

sequentially addressing a response memory with the sequence of addresses;

storing a code representative of the output response at selected locations of the response memory which are addressed by the reoccurring addresses;

reading codes from locations of the response memory which are addressed by the sequence of the selected pattern; and providing the output response based upon the codes read from the response memory.

20. A method according to claim 18 wherein the step of determining the frequency with which the addresses of the fist array reoccur is performed using a weighing array having address locations corresponding to the first array, and further wherein each time an address in the first array is addressed, a count number stored in the corresponding location in the weighing array is incremented.

21. A pattern processing system for identifying a class of input patterns comprising:

addressable means for providing, for each of a plurality of addressable locations, a value representative of a characteristic of data from an input pattern stored at the addressable location;

address sequencer means for providing an address stream containing a sequence of addresses in which each next address of the sequence is determined by a preceding address and the value corresponding to the preceding address; so that upon repetition of an address which has previously been provided in the sequence, the address stream cycles repetitively through an address loop which is a function of the input pattern for as long as the input pattern remains unchanged;

means responsive to the address stream for identifying the input pattern based upon the address loop produced by these address sequencer means, the means responsive to the address stream comprising:

response memory means for storing codes in a second array of locations addressable by the address stream;

training controller means for selectively causing a predetermined training code associated with a class of input training patterns to be written into the response memory means at locations of the second array addressed by the address stream when a selected input pattern is addressed by the address sequencer means, the training controller means including means for determining the frequency with which the addresses in the sequences for a plurality of respective training patterns reoccur, so that reoccurring addresses between the respective training patterns can be identified, and means for writing the training code for the class of patterns in the reoccurring addresses for the class; and response detector means for providing an output response based upon codes read out from locations of the second array addressed by the address stream.

22. The pattern processing system of claim 21 wherein the response detector means provides the output response based upon frequency of the codes read out from the response memory means.

23. The pattern processing system of claim 21 wherein each next address of the sequence provided by the address sequencer means has a plurality of possible values based upon the preceding addresses and the data associated with the preceding address, and wherein the value associated with the location corresponding to the preceding address determines which of the plurality of possible values is provided by the address sequencer means as the next address.

24. A system according to claim 21 wherein the training controller means includes a weighing array memory having address locations corresponding to the addressable means, and further including means responsive to an address being addressed in the addressable means for incrementing a count number at the corresponding address in the weighing array memory, whereby the frequency of addressing the various addresses of the addressable means is determined.

* * * * *